United States Patent [19]
Evans

[11] Patent Number: 5,989,017
[45] Date of Patent: Nov. 23, 1999

[54] DISPOSAL OF WASTE TIRES

[75] Inventor: Lawrence Paul Evans, Bearsted, United Kingdom

[73] Assignee: Blue Circle Industries PLC, United Kingdom

[21] Appl. No.: 08/837,690

[22] Filed: Apr. 22, 1997

[30]   Foreign Application Priority Data

Apr. 23, 1996 [GB] United Kingdom .................. 9608341

[51] Int. Cl.⁶ ..................................................... F27B 15/00
[52] U.S. Cl. ........................... 432/14; 432/106; 110/246; 110/346
[58] Field of Search ................................... 432/103, 104, 432/105, 106, 14; 110/246, 346

[56]   References Cited

U.S. PATENT DOCUMENTS

| | | | |
|---|---|---|---|
| 4,295,823 | 10/1981 | Ogawa et al. | 432/106 |
| 4,627,877 | 12/1986 | Ogawa et al. | 106/100 |
| 5,078,594 | 1/1992 | Tutt et al. | 432/103 |
| 5,806,442 | 9/1998 | Aldred et al. | 110/246 |
| 5,816,795 | 10/1998 | Hansen et al. | 432/14 |

FOREIGN PATENT DOCUMENTS

| | | |
|---|---|---|
| 109379 | 5/1984 | European Pat. Off. . |
| 568202 | 11/1993 | European Pat. Off. . |
| 764614 | 3/1997 | European Pat. Off. . |
| 764614A | 3/1997 | European Pat. Off. . |
| 23 43 954 | 3/1975 | Germany . |
| 2343954 | 3/1975 | Germany . |
| 3326375 A1 | 7/1993 | Germany . |
| 2015706 | 9/1979 | United Kingdom . |
| 2034014 | 5/1980 | United Kingdom . |

Primary Examiner—Philip H. Leung
Assistant Examiner—Jiping Lu
Attorney, Agent, or Firm—Welsh & Katz, Ltd.

[57]   ABSTRACT

Waste tires are disposed of in a cement-manufacturing or other mineral-burning process by introducing the tires into the hot gas stream at at least one point between the mineral-inlet end of a rotary kiln and the lowermost cyclone of an associated preheater system, e.g. into the gas stream within a precalciner vessel or riser duct, the tires being maintained in contact with the hot gas for a sufficient period to effect at least partial combustion of the tires. As an alternative, the tires may be introduced into a Lepol grate preheater.

18 Claims, 5 Drawing Sheets

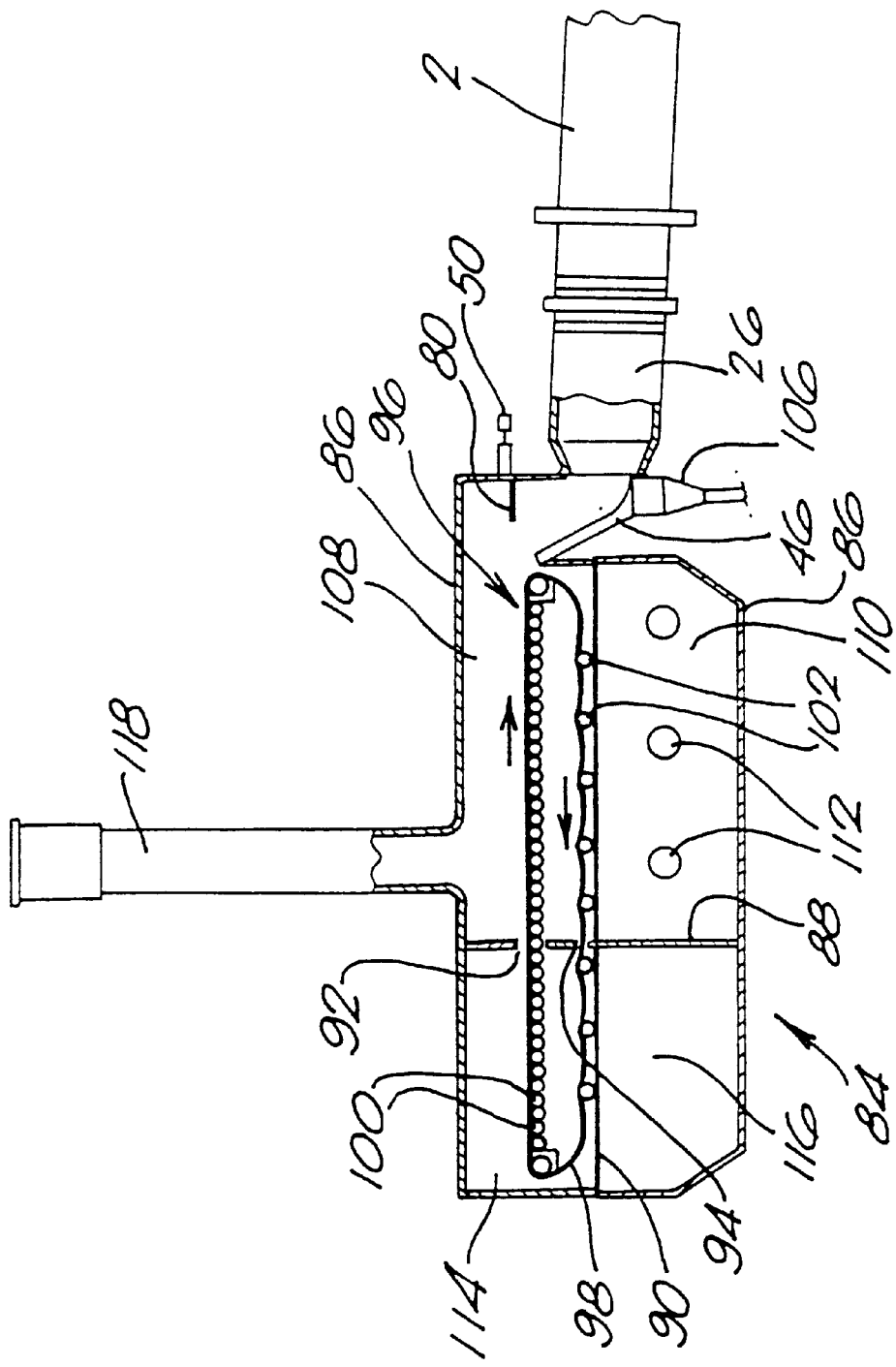

DISPOSAL OF WASTE TIRES

FIELD OF THE INVENTION

The present invention relates to a method of disposing of waste tires by feeding them into an operational preheater or precalciner system associated with a rotary kiln in which mineral matter is being processed, preferably a kiln in which cement is being manufactured. The present invention also relates to apparatus for effecting such a method.

BACKGROUND TO THE INVENTION

Every year large numbers of pneumatic tires, in particular automobile tires, are discarded. For example, it was reported in Rock Products, October 1980, that over 200 million automobile tires were being discarded every year in the United States, and that some 300,000 tons of old tires were being generated annually in what was then West Germany. A large proportion of waste tires are simply buried in landfill sites and there have been various proposals for using comminuted waste tires, e.g. in road-building asphalts; nonetheless, the environmentally acceptable disposal of waste tires still presents a considerable challenge.

It has been recognised that the calorific value of waste tires, at 27,000 kJ/kg, is comparable to that of coal and it is known to use chipped or otherwise comminuted tires as an auxiliary fuel in cement kilns. However, when account is taken of the capital investment needed for machines for chipping the tires and the energy costs in operating such machines, the cost benefits obtained by replacing coal or other fossil fuel with tire chips are often not substantial. Furthermore, if the tire chips are to be fed into a precalciner or preheater system, it is necessary carefully to control the velocity of the gas in that system to ensure adequate combustion of the chips before they are swept into the next stage of the preheater.

There have also been proposals for feeding whole tires directly into a rotary cement kiln. For example, U.S. Pat. No. 4,551,051 discloses apparatus by means of which whole tires may be delivered through the mineral-inlet end of a rotary cement kiln to a selected region of the kiln. In U.S. Pat. No. 5,078,594 an apparatus is described for charging whole tires through a port in the wall of a rotating cement kiln into a heated zone of the kiln.

However, the delivery of whole tires directly into a rotary cement kiln requires careful control to ensure that the tires are fully burnt within the kiln, that there is no localised reduction, which can lead to the build-up of solids and blockages in the lower stages of the preheater system, and that the solid residue is uniformly incorporated into the cement clinker.

DE-A-3,326,375 discloses a method for the production of cement clinker in a rotary kiln, in which the raw material is preheated in a multi-stage cyclone preheater and is then calcined using different fuel components in at least two different places in the preheater before entry into the rotary kiln. This method is characterised in that the raw material is preheated and calcined in two separate streams in separate strings of the preheater; in that a coarse particulate solid fuel component (for example used tires or lump coal) is supplied to the first preheater string at a point located close to the rotary kiln such that this fuel component arrives in the rotary kiln before complete combustion; and in that another fuel component, preferably a liquid, gaseous or fine particulate solid fuel component, is introduced into the second string of the preheater such that this fuel component is thoroughly mixed with the material to be calcined before complete combustion. It is suggested in this German patent application that this method permits the use of quite different types of fuel without the formation of coatings or other operational problems in the preheater; it is suggested that this is due to the fact that the coarse particulate fuel component is practically completely gasified in the rotary kiln (page 5, lines 1–6, and page 5, line 25 to page 6, line 1). In the detailed description of an illustrated embodiment, the point at which the coarse particulate solid fuel component is supplied to the first preheater string is selected such that the coarse particulate fuel will fall more or less freely through the inlet housing associated with the rotary kiln and thence into the rotary kiln itself, where it is gasified (page 11, lines 1–9). There is no disclosure or suggestion that the coarse particulate fuel is maintained in contact with the hot gas stream in the preheater; and it would appear that in essence the coarse particulate fuel is essentially subjected to pyrolysis and gasification within the rotary kiln, the resultant gas then being available for combustion in the preheater system.

U.S. Pat. No. 4,295,823 and U.S. Pat. No. 4,627,877 describe, and respectively claim, an apparatus and a method for continuously producing a cement clinker in which a combustible waste material is employed as a heat source. According to the disclosure in these U.S. patents, a cement raw material is fed into a preheating or calcining chamber, from which the resultant preheated or calcined material is forwarded into a heating region within a rotary kiln in order to convert the material into a cement clinker. The cement clinker is then moved into a cooling chamber in which its temperature is decreased by means of cooling air. Exhaust gas from the heating region in the rotary kiln is passed into the preheating or calcining chamber. The combustible waste material is fed into a heat-decomposition chamber into which exhaust gas from the heating region of the rotary kiln is also introduced and in which the combustible waste material is thermally decomposed in order to generate a combustible gas. This combustible gas is then conveyed to, and burnt within, the preheating or calcining chamber to preheat or calcine the cement material. Accordingly, the said waste material undergoes a pyrolysis and gasification process rather than combustion as such. Any solid residue from the thermal decomposition of the combustible waste material is allowed to pass into the heating region within the rotary kiln. Various combustible waste materials are mentioned, including tire wastes, rubber wastes, oil wastes, oil-containing sludges, asphalt wastes, pitch wastes, and organic compound wastes.

There remains a need for an improved method whereby whole tires can be disposed of in a cement-manufacturing process or the like.

SUMMARY OF THE INVENTION

The present invention now provides a method for disposing of tires in a mineral-burning process, preferably a cement-manufacturing process, carried out in a kiln system in which a rotary kiln is associated with a preheater section, wherein the tires are introduced into a hot gas stream within the preheater section, the tires being maintained (e.g. supported or suspended) in contact with the hot gas for a sufficient period to effect at least partial combustion of the tires.

In certain preferred embodiments, the preheater section comprises at least one cyclone and at least one heat-exchange duct, and the tires are introduced into the hot gas stream at at least one point between the mineral-inlet end of the rotary kiln and the lowermost cyclone. In certain of these embodiments a precalciner vessel will be located between the material inlet of the kiln and the lowermost cyclone.

The present invention also provides an apparatus for disposing of tires in a mineral-processing kiln system, preferably a cement kiln system, in which a rotary kiln is associated with a preheater section, which apparatus comprises means for supporting at least one tire within the preheater section and means for feeding tires to the supporting means.

In certain preferred embodiments, wherein the preheater section comprises at least one cyclone and at least one heat-exchange duct, the apparatus comprises gas-conveying means, preferably including a precalciner and/or a riser duct, which gas-conveying means is adapted to convey hot gas from the mineral-inlet end of the rotary kiln to the lowermost cyclone, the said gas-conveying means being provided with at least one inlet through which tires may be fed; means for selectively opening and closing the inlet; means for supporting at least one tire within the said gas-conveying means, preferably within the said precalciner or riser duct, such that the tire so supported will be in contact with hot gas (which term includes a mixture of gases) within the said gas-conveying means, preferably within the said precalciner or riser duct, during operation; and means for feeding tires through the inlet, when open, and to the said supporting means.

In certain other embodiments of the present method and apparatus, the preheater section comprises a Lepol grate preheater into which the tires are introduced and suspended in the gas stream which enters the grate preheater from the kiln.

BRIEF DESCRIPTION OF THE DRAWINGS

FIG. 5 is a schematic representation of part of a kiln system which comprises a Lepol grate preheater that is adapted for the disposal of tires in accordance with the present invention.

In the Figures, in which certain embodiments of the invention are illustrated for the purposes of exemplification, like parts are designated by like numerals. For the sake of clarity, pieces of ancillary equipment which are usual in cement-making plants but which are not required for an understanding of the present invention have been omitted from the drawings.

DESCRIPTION OF EXEMPLARY EMBODIMENTS

The present invention can be applied to the disposal of tires in mineral-processing systems, in particular mineral-burning systems, such as those in which lime, magnesia or dolomite is burnt. However, it is especially useful in cement-making systems, in terms of which it will be described hereinafter.

The raw meal for a Portland cement-manufacturing process is formed by grinding and blending calcareous and argillaceous raw materials; a typical mixture will comprise 70–90% by weight of limestone, 10–30% by weight of clay and 0–10% by weight of materials selected to adjust the mixture to the desired composition. During the cement-manufacturing process, the raw material passes through a series of stages, including a drying stage to remove free water, typically at a temperature of up to 100° C.; the removal of absorbed water, typically at 100–400° C.; the decomposition of the argillaceous minerals (e.g. kaolinite) to an intermediate stage (e.g. metakaolinite), typically at 400–750° C., and thence to free reactive oxides, typically at 600–900° C.; decomposition of carbonates to free reactive oxides, typically at 600–1,000° C.; combination of the reactive oxides to form intermediate or final clinker minerals, typically at 800–1,300° C.; formation of clinker melt from aluminates and ferrites, typically at 1,300–1,380° C.; and the formation of alite ($C_3S$), typically at 1,250–1,500° C. These chemical reactions are endothermic, with the exception of the said combination of the reactive oxides to form intermediate or final clinker materials, which is exothermic. These reactions take place in an oxidising environment; generally, reducing conditions are absent or are limited to small specific zones for reducing the $NO_x$ content in the combustion gas. In addition to the $C_3S$, the other important clinker minerals are $C_2S$, $C_3A$ and $C_4AF$.

Figure 1:
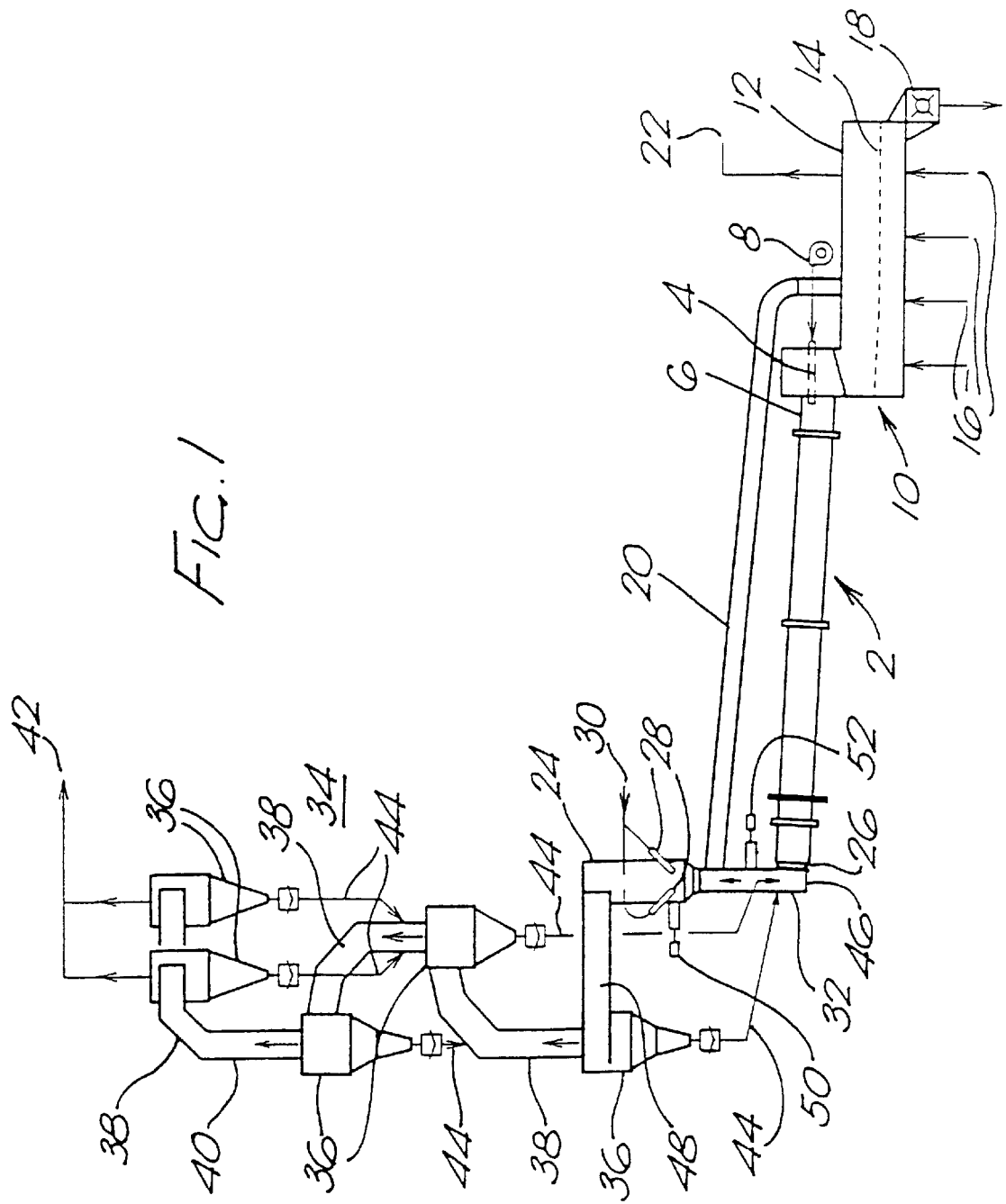
FIG. 1 is a schematic representation of a kiln system for the manufacture of Portland cement, which system comprises a combustion air-separate in-line-precalciner that is adapted for the disposal of tires in accordance with this invention.

The air-separate (or "AS") in-line precalciner kiln system illustrated in FIG. 1 comprises a rotary kiln 2, which is equipped with a burner 4 at its front (mineral outlet) end 6, the burner 4 being supplied with an appropriate source 8 of fuel, for example, pulverized coal, natural gas or fuel oil. The burner 4 may be equipped in known manner with one or more nozzles (not shown) for the injection of primary air for combustion.

The cement clinker which emerges from the front end 6 of the kiln 2 passes into a clinker cooler 10, which in the illustrated embodiment is a grate cooler comprising essentially a chamber 12 through which the clinker passes on a grate 14, through which grate is passed cooling air from a number of inlets 16. The clinker, which has thereby been cooled through heat-exchange with the cooling air, is then transported from the cooler outlet 18 for further processing, including grinding. The air that has been heated through heat-exchange with the hot clinker passes, in part, into the front end 6 of the kiln, as so-called "secondary air". A further portion of the air may be extracted from the grate cooler through a tertiary air duct 20. The residual hot air is taken off through the cooler exhaust 22.

A precalciner 24 is operatively connected to the mineral inlet, or back end, 26 of the kiln. The precalciner 24 is provided with one or more burners 28 which are provided with a supply 30 of an appropriate fuel, for example pulverised coal, natural gas or fuel oil. Air for the combustion of the fuel within the precalciner 24 is obtained partly from the hot gas emerging from the mineral inlet 26 of the kiln, which inlet communicates with the precalciner 24 by means of a riser duct 32. The greater part of the air for combustion in the precalciner 24 is, however, supplied through the above-mentioned tertiary air duct 20.

The ground starting materials (the "raw meal") are not fed directly into the rotary kiln 2 but, instead, are passed into a preheater system 34 comprising a plurality of cyclones 36 and riser ducts 38, which are arranged in a generally vertical series. The hot gases from the kiln and the precalciner enter the lowest stage and are drawn upwards by means of a waste-gas fan (not shown) through the riser ducts 38 (which act as a series of heat-transfer vessels). The meal is introduced through an inlet 40 near the top of the system into the highest riser duct, which connects the topmost cyclones to the next highest cyclone. The gas flow carries the meal up to the top cyclones allowing heat transfer to take place. The top cyclones separate the meal and the gas streams, the gas being taken off through the preheater exhaust 42 and the meal being conveyed downwards through meal conduits 44 into the next highest riser duct where the meal is again picked up by a gas stream. This pattern is repeated down through the preheater system 34 until the meal is transferred through a meal conduits 44 from the penultimate cyclone to the riser duct 32 connecting the back end 26 of the kiln with the precalciner 24. Some of that meal will drop into the kiln hearth 46 and thence into the kiln; however, a substantial proportion of the meal will be entrained in the hot gas rising through that riser duct 32 and so will be carried into the precalciner 24. The mixture of gas and meal leaving the precalciner 24 is conveyed through a conduit 48 to the lowermost cyclone, the gas stream from which passes into the next riser duct 38 of the preheater system 34 whereas the meal that is separated out in the lowermost cyclone is passed to the kiln hearth 46 adjacent the back end 26 of the kiln. For the purposes of this specification the precalciner 24 and the kiln riser duct 32 located between it and the back end 26 of the kiln 2 in such AS systems may be regarded as part of the preheater system 34.

In practice, very little heat exchange occurs within the cyclones, which are primarily a means for separating the meal and gas flows. The upper preheater stages tend simply to preheat the meal but within the two lowermost stages decarbonation begins to occur.

Typically, in an air-separate precalciner system such as that illustrated in FIG. 1, approximately 60% of the total fuel is combusted in the precalciner 24. Typically, the gas residence time in the precalciner vessel 24 is about 2 seconds and the mineral material is exposed therein to gas temperatures of 860–900° C., as a result of which a decarbonation level of approximately 92% is typically achieved within the precalciner vessel 24. The thermal load on the kiln tube is accordingly reduced and in such a system approximately 40% of the total fuel is used to complete the decarbonation process and to raise the mineral material to the sintering zone temperatures required to produce the final clinker.

In accordance with the present invention, the precalciner vessel 24 is fitted with a tire-feeder device 50 and means (not shown in FIG. 1) for supporting the tires fed into the precalciner vessel 24 in contact with the hot gas therein for a sufficient time to achieve at least partial combustion of the tires.

If required for staged combustion, a further tire feeder 52 may be fitted to the kiln riser duct 32 connecting the kiln inlet 26 to the precalciner vessel 24. By "staged combustion" is meant the practice where a plurality of points are provided for the introduction of fuel in the riser and precalciner ducts. The staging is primarily aimed at completing some proportion of the fuel combustion in a region of the riser duct where there would be a surplus of fuel introduced relative to the air available for combustion. This would give rise to so-called reducing conditions in this region with the objective of eliminating a significant proportion of the $NO_x$ generated within the burning zone of the kiln. The remainder of the fuel would then be introduced at a point after tertiary air is mixed with the gases coming from the kiln riser 32, and this second stage of combustion reduces the carbon monoxide and volatiles that have been generated in the initial stage of combustion.

Figure 2:
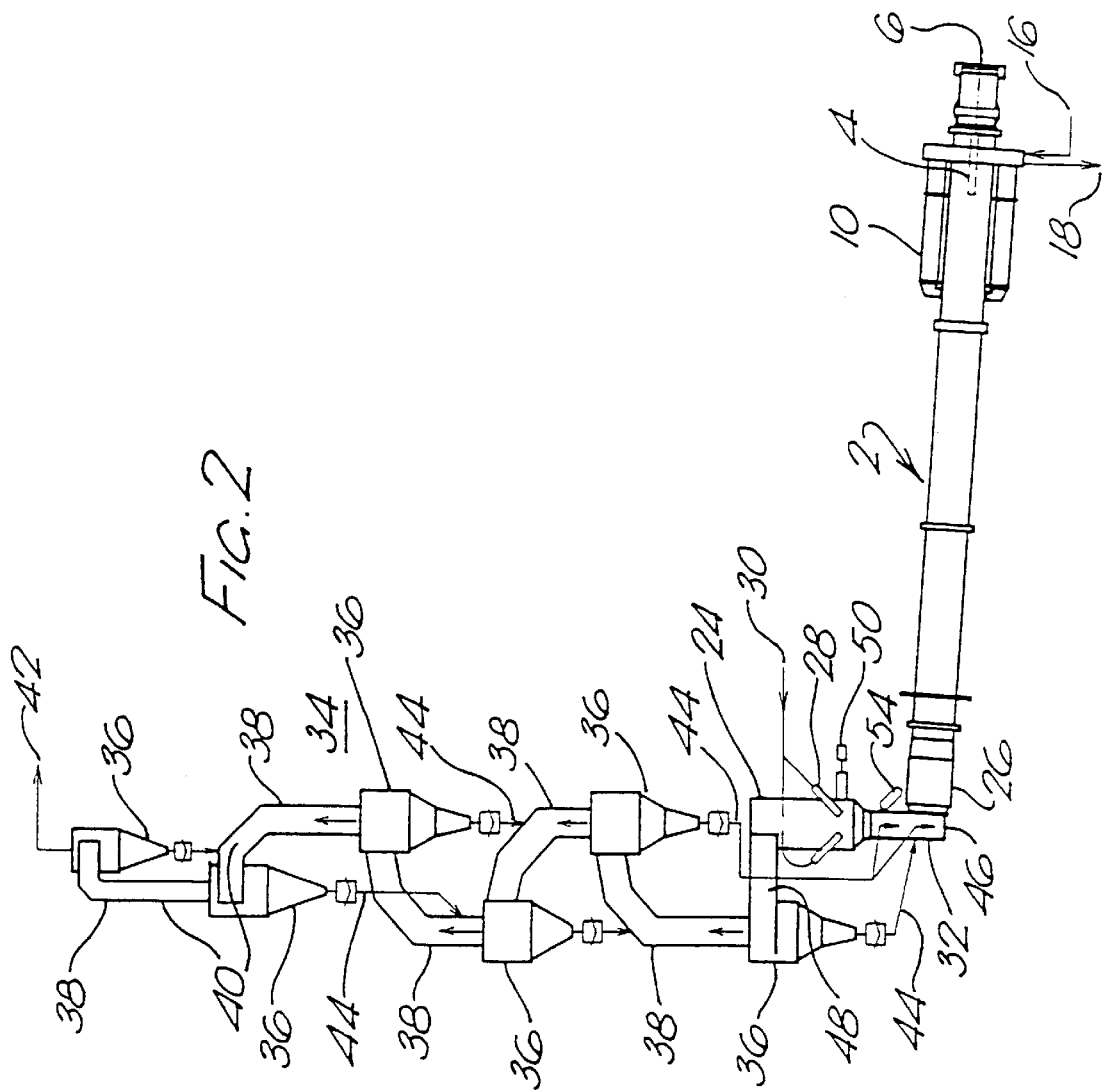
FIG. 2 is a schematic representation of a kiln system for the manufacture of Portland cement, which system comprises a combustion air-through in-line precalciner that is adapted for the disposal of tires in accordance with this invention.

The kiln system illustrated in FIG. 2 differs from the kiln system of FIG. 1 in six main respects. First, there is a different arrangement of cyclones 36 in the preheater section 34, although the same basic principles of operation apply. Second, there is no auxiliary tire-feeder associated with the riser duct between the kiln inlet and the precalciner vessel 24. Third, the system uses a planetary cooler 10 in place of the grate cooler, and this gives rise to a fourth difference which is that substantially all of the air that has been heated by heat-exchange with the hot clinker in the cooler 10 is utilised, not as tertiary air, but as secondary air which passes through the kiln 2 to the precalciner 24. Fifth, an air blaster 54 is associated with the riser tube 32 but this is not necessary either for the tire feeder or the operation of the present process. Sixth, the raw meal feed is introduced into the top two riser ducts 38 through respective inlets 40. In this air-through (or "AT") arrangement, the apportionment of the total fuel is typically 65% to the kiln burner 4 and 35% to the precalciner burners 28. Decarbonation rates of 40–70% are typically achieved before the meal enters the kiln 2. Again, for the purposes of this specification, the precalciner 24 and the riser duct 32 located between it and the back end 26 of the kiln 2 in such AT systems may be regarded as part of the preheater system 34.

Figure 3:
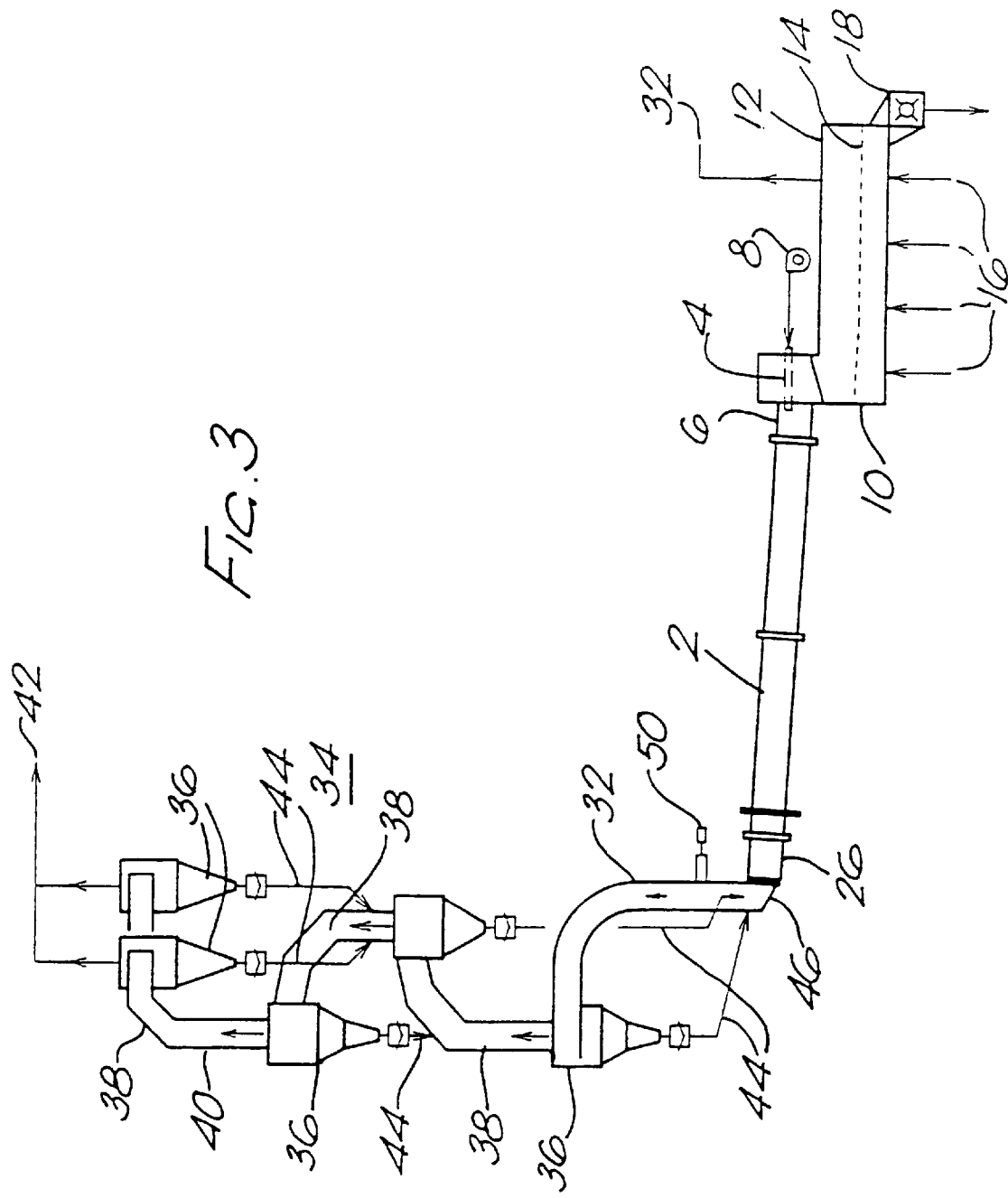
FIG. 3 is a schematic representation of a kiln system for the manufacture of Portland cement, which system comprises a suspension preheater riser duct that is adapted for the disposal of tires in accordance with this invention.

The kiln system of FIG. 3 differs primarily from the kiln system of FIG. 1 in that the precalciner 24 is dispensed with and the riser duct 32 from the kiln inlet 26 is directly connected to the lowermost cyclone 36 of the preheater section 34. Furthermore, there is no tertiary air duct: all of the air which is heated by heat-exchange with the hot clinker in the grate cooler 10 (other than the air which is vented through the cooler exhaust 22) is employed as secondary air, which passes through the kiln 2 into the kiln riser duct 32. In suspension preheater (or "SP") kiln systems of this type, a level of decarbonation of 25–50% is typically achieved before the meal enters the kiln 2. For the purposes of this specification the riser duct 32 located between the lowermost cyclone 36 and the back end 26 of the kiln in such SP systems may be regarded as part of the preheater system 34.

The vertical section of the riser duct 32 shown in FIG. 3 is equipped with a tire feeder 50 and associated means (not shown in FIG. 3) for supporting the tires within the kiln riser duct 32 in contact with the hot gas in that duct for a time sufficient to achieve at least partial combustion of the tires.

It will be understood that the present invention can be put into practice with precalciner or preheater kiln systems with arrangements different from those illustrated in FIGS. 1–3. For example, the air-through system could comprise a grate cooler in place of the planetary cooler whereas the preheater system could comprise a planetary cooler instead of the grate cooler; indeed, in principle, another type of clinker cooler may be used, for example a rotary underlying cooler of the type marketed by F. L. Smidth under the trade name "Duax". Furthermore, hot gas exhausted from the kiln hood may be passed back into the system so that its heat content and oxygen content may be utilised. Moreover, again by way of example, the number and arrangement of cyclones and riser ducts in the preheater section may be varied according to the demands placed upon the cement-manufacturing plant. Also, the number of tire-feeders may be increased to two or more, in order to increase the rate of disposal, subject of course to the dimensions of the precalciner and/or riser duct and the cement-production capacity of the system.

Figure 4:
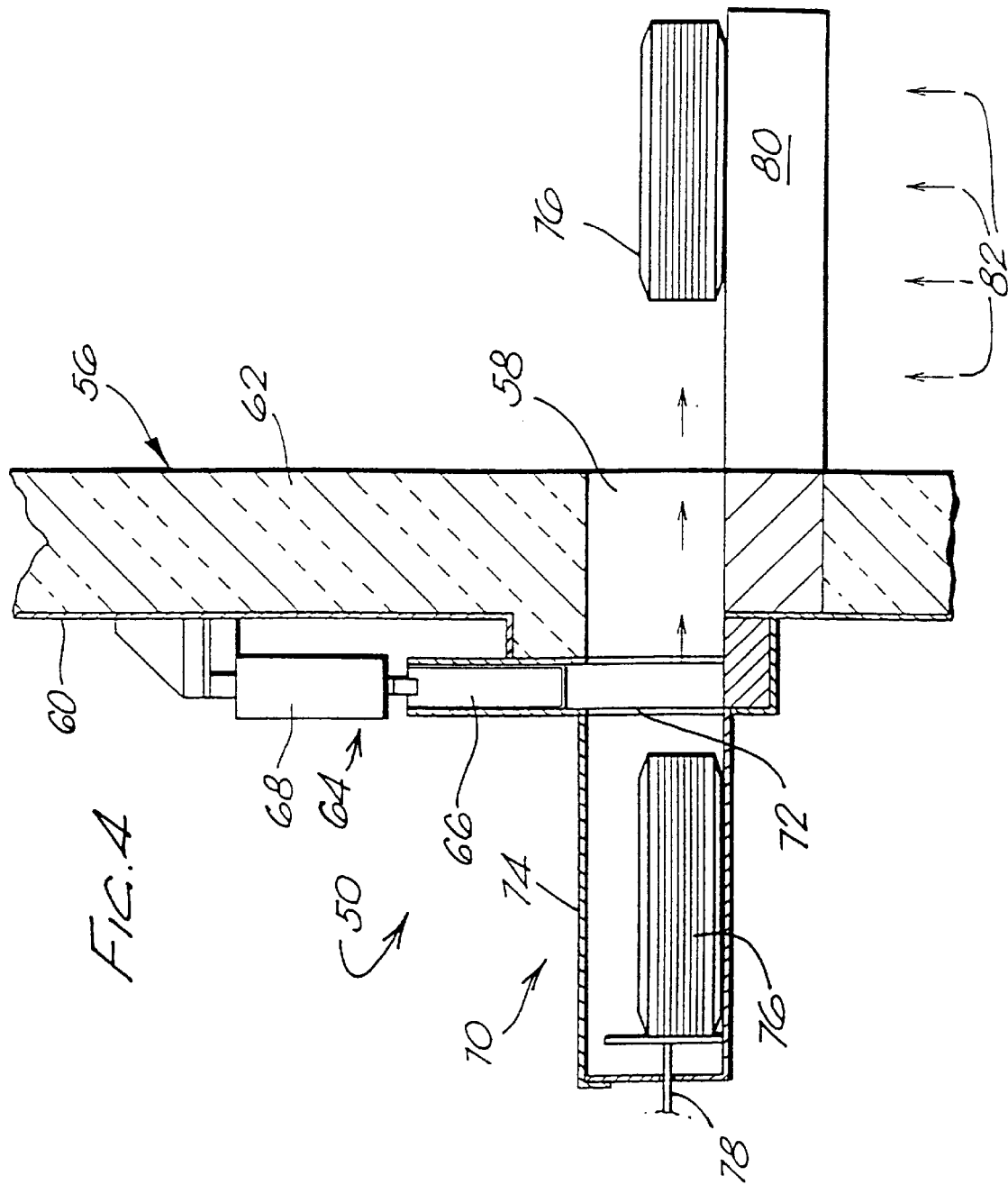
FIG. 4 is a schematic representation of apparatus for feeding tires into a precalciner or a preheater riser duct in accordance with the present invention.

Turning now to FIG. 4, there is illustrated a tire feeding system 50 that may be incorporated into the wall 56 of a precalciner or preheater riser duct in accordance with this invention. The feeding system comprises an inlet or entry port 58 in the wall 56 of the precalciner or riser duct, which wall comprises an outer casing 60 and an inner lining 62 of refractory material. The inlet is provided with closure means 64 which comprises a shut-off gate 66 which is selectively movable by means of a pneumatic cylinder 68 between a first position where the gate seals the inlet port 58 completely, and a second position where the said gate is retracted away from the inlet port. Aligned with the inlet port is a seal box 70 which has an opening 72 at the side thereof that is adjacent the inlet port. The opening 72 in the seal box 70 is also selectively closed or opened by the shut-off gate 66 when the latter is in its first or second position, respectively.

The operation of the feeding system is as follows. First, the shut-off gate 66 is moved to the first position so as to seal both the inlet port 58 and the said opening 72 in the seal box 70. The seal box 70 is provided with a cover 74, which is lifted or retracted so as to permit the placement of a tire 76 into the seal box 70, after which the cover 74 is returned to its closed position. The shut-off gate 66 is then retracted to its second position and a ram feeder 78, which has hitherto been retracted, is extended so as to push the tire 76 through the opening 72 in the seal box and through the inlet port 58 onto a tire support 80 located within the precalciner (e.g. 24, as in FIG. 1 or 2) or the riser duct (e.g. 32, as in FIG. 3) and which is rigidly attached to the wall 56 thereof. The tire is thereby located in the flow 82 of gas within the precalciner or riser duct. The ram feeder 78 is then retracted and the shut-off gate 66 is returned to the first position to seal the inlet port 58. It will be seen that the operation of the shut-off gate 66 and the seal box 70 is such as to minimise the ingress of cool ambient air into the precalciner or riser duct during the tire-feeding operation and to minimise the emission of hot gas from the precalciner or riser duct. If desired, means (not shown) may be provided to enable the shut-off gate to be bolted shut when the tire-disposal system is not in operation so as to prevent air leaking into or gas leaking out of the precalciner or riser duct. In prototype or small-scale operations, the pneumatic cylinder for the shut-off gate may be manually actuated, and the ram feeder may be manually operated. However, for normal commercial operations, the ram feeder will be hydraulically or mechanically operated and its operation, as well as the operation of the shut-off gate and the means for conveying the tires to the seal box will be under automated control.

Since the combustion of tires is intensely hot, the feeder system preferably locates the tire on the support 80 at a sufficient distance from the wall so as to avoid undue damage to the refractory lining.

FIG. 5 illustrates a kiln system comprising a Lepol grate preheater defined generally by an outer wall 86, the interior space of which is subdivided into four chambers by a generally vertical partition wall 88 and a generally horizontal, raised floor 90. The upper part of the partition wall 88 (the part above the floor 90) has an upper aperture 92 and a lower aperture 94 therein.

Mounted on the raised floor 90 is a travelling grate system 96 comprising a grate 98 in the general form of an endless belt, the upper flight of which is supported on rollers 100 and the lower, or return, flight of which is supported on lower rollers 102. Inlet means (not shown) are also provided for the feeding of nodulised raw material from a feed hopper (not shown) onto the upper flight of the travelling grate 98, at or near the left-hand end thereof (as shown in the figure). The travelling grate, in operation, is moved by driving means (not shown) such that the upper flight moves from left to right (as shown in the figure), the said upper flight and the bed of raw material thereon passing through the upper aperture 92 in the partition wall 88. The lower, or return, flight of the travelling grate 98 passes through the lower aperture 94 in the partition wall 88.

The raw material is discharged from the upper flight of the travelling grate 98 at the right-hand end thereof (as shown in FIG. 5) onto the kiln hearth 46 and thence into the back end 26 of the kiln 2. A receptacle 106 may be provided for the collection of any spillage of solids from the back end 26 of the kiln 2.

In operation, the gas emerging from the back end 26 of the kiln flows into a first chamber 108, commonly known as the "above calciner chamber", and is then drawn down by the so-called intermediate fan (not shown) through the bed of material on that part of the upper flight of the travelling grate 98 that is within the above calciner chamber 108. The gas then passes into a second chamber 110, commonly known as the "below calciner section", the floor 90 being so constructed as to allow the passage of gas from the first chamber 108 to the second chamber 110. The gas is then drawn out of the below calciner section 110 through outlets 112 and then through the intermediate cyclones (not shown) and fan (not shown), and then into a third chamber 114, commonly referred to as the "above drier section", via an inlet (not shown). The gas is drawn down—by the main, induced-draught fan (not shown)—through the raw material on that part of the upper flight of the travelling grate 98 that is within the above drier section 114. The gas then passes into the fourth chamber 116, also known as the "below-drier section" (the floor 90 being so constructed as to allow the passage of the gas), from which section 116 the gas is exhausted through means (not shown) to a gas-cleaning device (not shown). Thus, the hot gases from the kiln are utilised in the Lepol grate system for the preheating and/or precalcination of the raw material in the above calciner chamber 108, and also for the drying of the raw material that has been fed onto the travelling grate 98 within the above drier section. If appropriate, an auxiliary stack 118 may be provided for the purposes of warming up the grate (the auxiliary stack thereafter playing no part in the gas flow through the system during operation).

A tire-feeding device 50 is provided for the purpose of feeding waste tires onto a support 80 attached to the interior of the wall 86 and extending into the above calciner chamber 108 above the kiln hearth 46. The operation of the tire feeding device 50 may be as described above in connection with FIG. 4.

The tire support within the precalciner or riser duct or the Lepol grate system may be a simple shelf or platform having appropriate dimensions to support the tire whilst it undergoes combustion in contact with the hot, oxidising gas within the precalciner or riser duct. However, in order to increase the surface area of the tire that is in contact with the hot gas, and thereby to increase the rate of combustion of the tire, it is preferred that the support be provided with one or more apertures or gaps through which the hot gas may come into contact with at least a portion of the lowermost surfaces of the supported tire. Thus, for example, the tire support may be an apertured plate or may be composed of a plurality of elements that are spaced apart so as to provide the said gap or gaps. In principle, it would be possible to form the tire support as, for instance, a grid or network of crisscrossing elements; however, a currently preferred form of tire support is constituted by a plurality of spaced-apart elongate elements, such as tubes, rods or "fingers", extending into the precalciner or riser duct space from the wall thereof. Preferably, the elongate elements forming the support are substantially coplanar and are conveniently arranged in a parallel orientation. Tire-supports having conduits therein for a coolant fluid also may come into consideration.

As a guide, the temperature of the gas stream in the zone where the tires are supported for at least partial combustion will commonly be at least 500° C., typically at least 700° C., for example at least 800° C., and will commonly be up to 1200° C., typically up to 1100° C., for example up to 1000° C.

Since it is normally intended in accordance with this invention that the tire waste (apart from the residue, if any, that may be conveyed into the rotary kiln) shall undergo combustion rather than pyrolysis and/or gasification, the gas stream should normally provide the supported tires with an oxidising atmosphere. The gas that is brought into contact with the waste tire will normally contain at least 2% by volume of molecular oxygen ($O_2$), and commonly at least 3% by volume. The content of molecular oxygen in the said gas stream will, in general, not exceed 21% by volume and, in order to ensure proper operation of the kiln system, will normally be somewhat lower, usually not more than 12% by volume, more usually not more than 10%, commonly up to 8%, for example up to 6%. A typical content of oxygen in the gas stream in the region where the tires are combusted is from 3 to 4% by volume.

It will be understood that as the combustion proceeds, the mass of the supported tire will be reduced. Accordingly, and especially in systems where the gas flow through the relevant section of the precalciner or riser duct is of high velocity, consideration may also be given to providing elements to both sides of, and/or above, the supported tire to act as restraints against possible premature dislodgement of the tire by the gas flow. This may be particularly advantageous in systems where the duct lacks an expanded region, since gas velocities may then reach 20–25 $m.s^{-1}$ or even go up to 30 $m.s^{-1}$. In systems with expanded ducts the velocities may be lower, e.g. about 6 $m.s^{-1}$, and premature dislodgement of the tires may cease to occur.

The residence time during which a tire is maintained in the hot gas stream for combustion will depend on a number of factors, for example the temperature and oxygen content of the gas. As a guide, the residence time will normally be from 5 seconds to 5 minutes, for example from 10 seconds to 1 or 2 minutes.

The tire support is normally, of course, constantly exposed to a hot oxidising environment. Although consideration may be given to the use of consumable supports, for example rod-like elements that may be advanced through the riser duct or preheater wall at a rate to compensate for the consumption of the elements within the riser duct or preheater, it is preferred for ease of construction to use fixed elements. However, the fixed elements should be sufficiently durable to avoid the need for frequent replacement and the uneconomic shut-downs that this would entail. A currently preferred material is high-alumina refractory material reinforced with stainless steel.

After complete combustion of the rubber component of the tires, the reinforcement of the tires, commonly zinc-coated steel wires, may remain. This residue will be dislodged from the tire support, either by the gas flow or by the next incoming tire, and will generally burn off in the gas stream or fall into the kiln where it will undergo complete combustion and incorporation into the clinker. The composition of the raw meal may, of course, be adjusted so as to make allowance for the content of metal introduced with the tires. In fact, it has been found that the tires need not always combust completely on the support. For example, it has been found that the combustion of 30–90% by weight of the rubber mass of the tire leaves a residue that can usually be tolerated within the rotary kiln, where the residue will combust completely without causing instability and without having a deleterious effect on the cement product, although it is preferred that 50% or more, especially 70% or more, by weight of the rubber mass be combusted whilst the tire is maintained in contact with the hot gas in the preheater section. If it can be tolerated, dislodging the tires into the kiln before they are completely combusted could be a way of increasing the disposal rate.

In air-separate precalciner systems, wherein the bulk of the air for combustion within the precalciner is supplied through the tertiary air duct, consideration may be given to the introduction of tires in the riser duct between the back end of the kiln and the precalciner vessel, or to the arrangement for partially combusted tire residues to enter that riser duct from the preheater vessel. The conditions may be controlled so as to allow the tires or the tire residues to burn in that riser duct in a reducing atmosphere, which will assist in the reduction of the content of $NO_x$ (nitrogen oxides) which has been generated during fuel combustion in the clinkering zone of the kiln.

The term "tires", as applied herein to tires to be disposed of according to this invention, includes not only whole tires, that is to say tires that have not been shredded, reduced to chips or otherwise comminuted, but also tire fragments (which term includes chunks, pieces, granules, shreds and the like), for example as obtained by coarse size reduction, for instance crushing, which fragments will generally have a size of not less than 150 mm. The expression "whole tires" includes tires that are damaged or worn. The tires will usually be motor-car tires but tires from motorcycles, vans, lorries, buses, coaches and other motor vehicles come into consideration.

EXAMPLE

The precalciner of an air-separate precalciner kiln system for the manufacture of ordinary Portland cement was equipped with a tire support comprising three parallel refractory fingers extending from the refractory-lined interior wall of the precalciner. The refractory fingers were so dimensioned and arranged as to provide support for an automobile tire lying on its side. Specifically, the fingers were constructed of stainless steel (20Cr, 20Ni) tubes coated with Durax high-alumina concrete. The fingers, which each had an outside diameter of 50–70 mm, extended 1.5.m into the kiln. The tires were supported at a distance of 0.5 m from the precalciner wall.

Approximately 120 automobile tires were fed manually through a double-flap system onto the refractory fingers at a rate of addition of 1 tire every 30 seconds, which corresponded to a rate of about 1 tonne per hour. The burners in the plant were coal-fired and the amount of coal consumed was reduced by an amount commensurate with the calorific value of the tires that were introduced.

The precalciner did not have an expanded duct and the gas velocity through it was comparatively high, at 13 $m.s^{-1}$. A drop of 2% in the kiln back-end oxygen, the occurrence of some CO spikes and an increase in kiln back-end temperature of 70–80° C. were detected, from which it was deduced that the tires were being swept off the finger frame before complete combustion and the residues were falling into the back of the kiln. However, the kiln remained stable and there was no reduction in the kiln production rate. Furthermore, the second stage and preheater exit conditions remained steady and no instability was detected int he preheater $O_2$ and CO levels.

In the Lepol grate device shown in FIG. 5, the floor 90 can preferably be omitted and the travelling grated system 96 may be supported on transverse rods or beams in conventional manner. The chambers 108, 110, 114 and 116 would then be formed by the partition wall 88 and the travelling grate 98 itself (preferably the upper flight thereof).

It will of course be understood that the present invention has been described above purely by way of example and that modifications of detail can be made within the scope of the invention.

I claim:

1. A method for disposing of tires having a rubber content in a mineral-burning process carried out in a kiln system in which a rotary kiln is associated with a preheater section, comprising the steps of introducing the tires into a hot gas stream within the preheater section, and maintaining the tires in contact with the hot gas stream within the preheater section for a period to effect combustion of at least 30% by weight of the rubber content of the tires.

2. A method according to claim 1, wherein the preheater section comprises at least one cyclone and at least one heat-exchange duct, the method comprising the step of introducing the tires into the hot gas stream at at least one point between the mineral-inlet end of the rotary kiln and the lowermost cyclone.

3. A method according to claim 2 wherein the preheater section comprises a precalciner vessel between the mineral-inlet end of the kiln and the lowermost cyclone, the method comprising the step of introducing the tires into the said precalciner vessel.

4. A method according to claim 2 wherein the preheater section comprises a riser duct between the mineral-inlet end of the kiln and the lowermost cyclone, the method comprising the step of introducing the tires into the said riser duct.

5. A method according to claim 2, wherein the preheater section comprises a precalciner vessel and a riser duct between the matierla inlet end of the kiln and the lowermost cyclone, the method comprising the step of introducing the tires into one of the precalciner vessel and the riser duct.

6. A method according to claim 1 wherein the preheater section comprises a Lepol grate preheater, the method comprising the step of introducing the tires into the Lepol grate preheater.

7. A method according to claim 1 wherein the mineral-burning process is a cement-manufacturing process.

8. A method according to claim 1 including introducing the tires into the hot gas stream at a temperature of at least 500° C.

9. A method according to claim 1 wherein the step of introducing the hot gas stream to the tires provides an oxidizing atmosphere.

10. A method according to claim 9 wherein the said hot gas stream comprises from 2% to 12% by volume of molecular oxygen.

11. A method according to claim 9 wherein the said hot gas stream comprises from 3% to 10% volume of molecular oxygen.

12. A method according to claim 1 including the step of combusting at least 50% by weight of the rubber content of the tires during the period in which the tires are maintained in contact with the said hot gas within the preheater section.

13. A method according to claim 1 wherein a tire is maintained in contact with the hot gas by a support.

14. A method according to claim 13 wherein the support has at least one aperture or gap through which hot has may come into contact with at least a portion of the lowermost surfaces of the supported tire.

15. A method according to claim 14 wherein restraining elements are provided to avoid premature dislodgement of the tire from the support.

16. A method according to claim 13 wherein the support has a plurality of spaced-apart elongate elements.

17. A method according to claim 16 wherein restraining elements are provided to avoid premature dislodgement of the tire from the support.

18. A method according to claim 13 wherein restraining elements are provided to avoid premature dislodgement of the tire from the support.

* * * * *